(12) United States Patent
Peleg

(10) Patent No.: US 9,430,706 B1
(45) Date of Patent: Aug. 30, 2016

(54) SYSTEM AND METHOD FOR DETECTION OF IN-VIVO PATHOLOGY SEQUENCES

(71) Applicant: GIVEN IMAGING LTD., Yoqneam (IL)

(72) Inventor: Dori Peleg, Haifa (IL)

(73) Assignee: GIVEN IMAGING LTD., Yoqneam (IL)

( * ) Notice: Subject to any disclaimer, the term of this patent is extended or adjusted under 35 U.S.C. 154(b) by 0 days.

(21) Appl. No.: 14/503,486

(22) Filed: Oct. 1, 2014

Related U.S. Application Data

(60) Provisional application No. 61/885,587, filed on Oct. 2, 2013.

(51) Int. Cl.
   G06K 9/00 (2006.01)
   G06T 7/00 (2006.01)

(52) U.S. Cl.
   CPC ....... G06K 9/00765 (2013.01); G06K 9/00624 (2013.01); G06T 7/0012 (2013.01)

(58) Field of Classification Search
   None
   See application file for complete search history.

(56) References Cited

U.S. PATENT DOCUMENTS

| | | | |
|---|---|---|---|
| 7,009,634 B2 | 3/2006 | Iddan et al. | |
| 7,567,692 B2 | 7/2009 | Buzaglo et al. | |
| 7,596,403 B2 | 9/2009 | Horn | |
| 7,684,599 B2 | 3/2010 | Horn et al. | |
| 7,724,928 B2 | 5/2010 | Glukhovsky et al. | |
| 7,914,442 B1 | 3/2011 | Gazdzinski | |
| 7,986,337 B2 | 7/2011 | Davidson et al. | |
| 8,265,390 B2* | 9/2012 | Dube | G06K 9/342 382/131 |
| 8,335,362 B2 | 12/2012 | Vilarino et al. | |
| 8,396,327 B2 | 3/2013 | Spyridonos et al. | |
| 8,423,123 B2 | 4/2013 | Horn | |
| 8,441,530 B2 | 5/2013 | Radeva et al. | |
| 8,483,432 B2* | 7/2013 | Patwardhan | G06T 7/0089 382/103 |
| 8,626,268 B2 | 1/2014 | Adler et al. | |
| 8,768,024 B1 | 7/2014 | Zingman et al. | |
| 8,861,783 B1 | 10/2014 | Peleg | |
| 8,867,812 B2* | 10/2014 | Li | A61B 5/055 382/128 |
| 8,873,816 B1 | 10/2014 | Peleg et al. | |
| 8,913,807 B1 | 12/2014 | Horn et al. | |
| 8,922,633 B1 | 12/2014 | Pfeffer | |
| 8,923,585 B1 | 12/2014 | Peleg | |
| 8,965,079 B1 | 2/2015 | Zinaty et al. | |
| 2002/0173718 A1 | 11/2002 | Frisch et al. | |
| 2002/0177779 A1 | 11/2002 | Adler et al. | |
| 2007/0118012 A1 | 5/2007 | Gilad | |
| 2007/0263915 A1* | 11/2007 | Mashiach | G06K 9/342 382/130 |
| 2009/0278538 A1* | 11/2009 | Chen | G01R 33/446 324/309 |
| 2010/0166276 A1* | 7/2010 | Dube | G06K 9/342 382/131 |
| 2013/0109915 A1 | 5/2013 | Krupnik et al. | |

* cited by examiner

*Primary Examiner* — Soo Jin Park
(74) *Attorney, Agent, or Firm* — Pearl Cohen Zedek Latzer Baratz LLP

(57) ABSTRACT

An in-vivo imaging system and method to automatically detect a pathology frame sequence in an image stream captured in vivo. An image stream comprising a plurality of image frames captured in vivo may be received, and a pathology score for at least a portion of the image frames is received. A seed frame which includes at least one pathology candidate may be selected, and the position of the pathology candidate in the seed frame may be determined. A sequence of frames adjacent to the seed frame is defined comprising frames that depict the pathology candidate, and a pathology sequence score is calculated based on the sequence, the pathology sequence score correlating to the probability that the sequence of frames adjacent to the seed frame includes a pathology. If the pathology sequence score is within a range, a display method may be adapted, or the pathology score may be changed based.

23 Claims, 10 Drawing Sheets

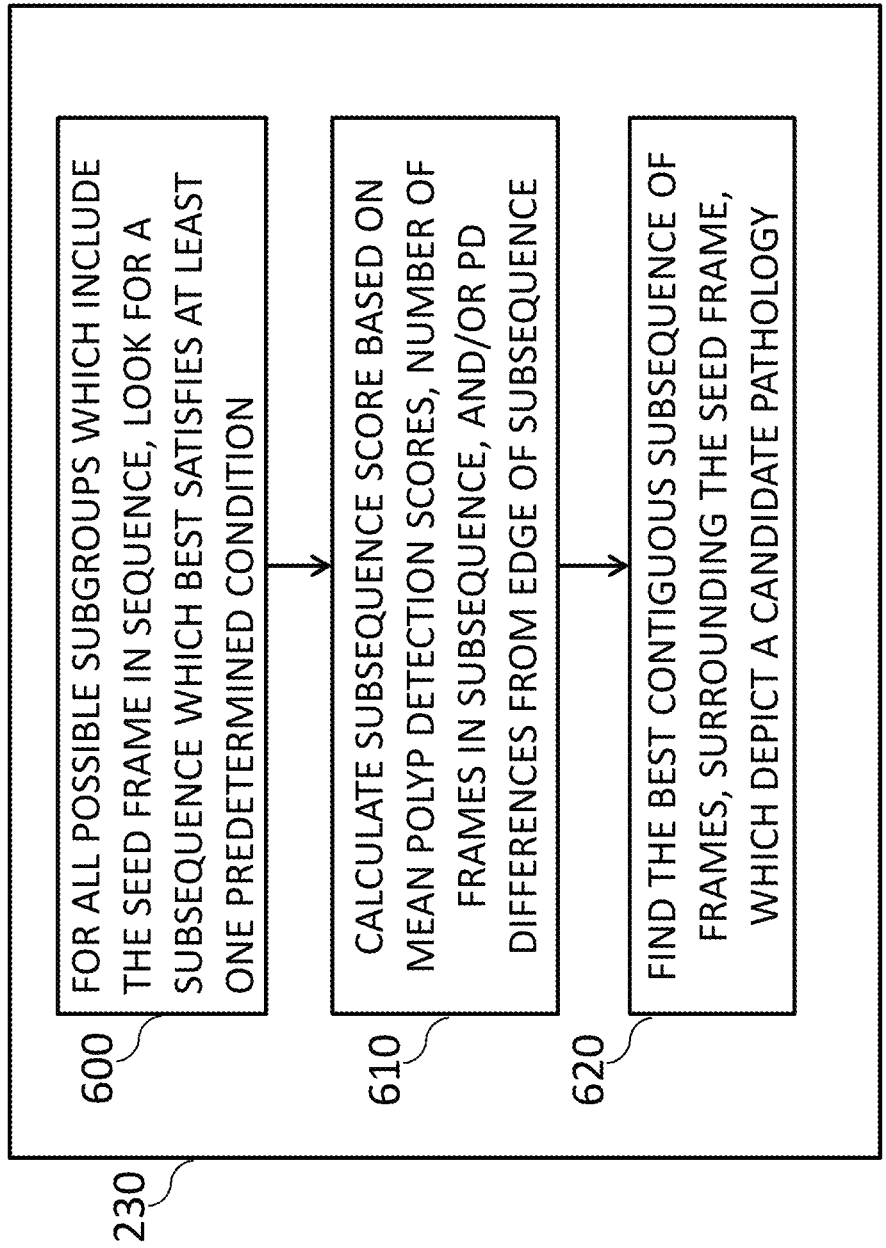

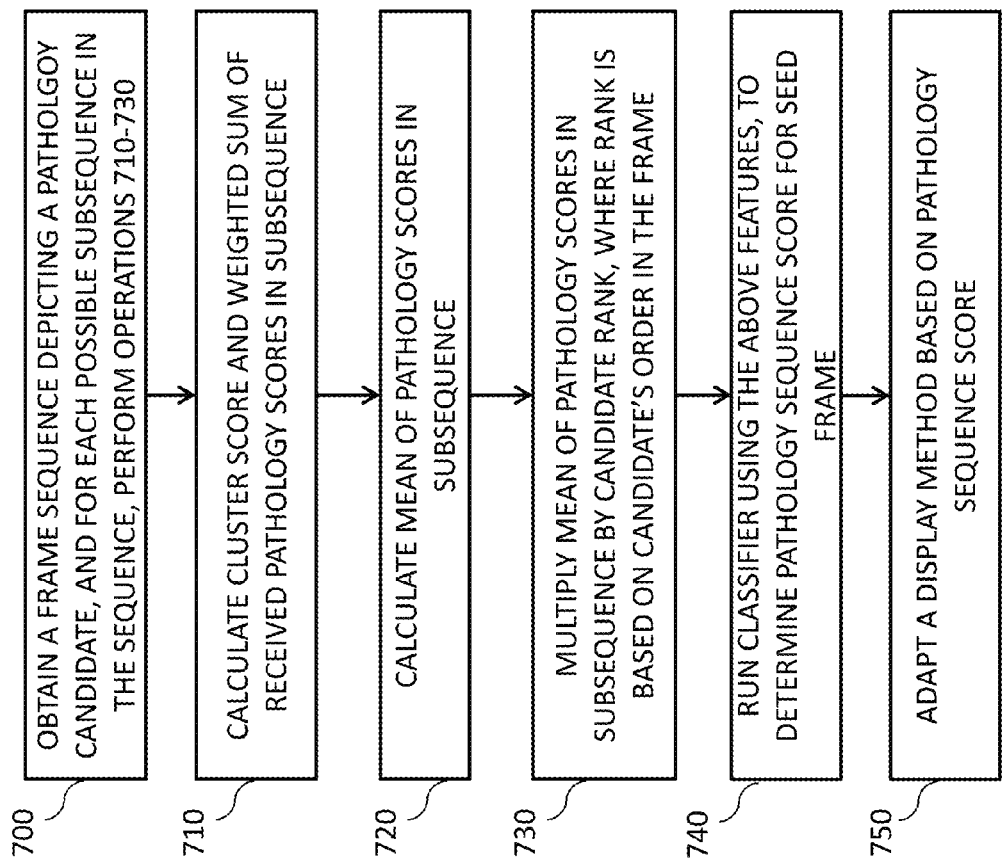

SYSTEM AND METHOD FOR DETECTION OF IN-VIVO PATHOLOGY SEQUENCES

PRIOR APPLICATION DATA

The present application claims the benefit of prior provisional application Ser. No. 61/885,587, filed on Oct. 2, 2013, incorporated by reference herein in its entirety.

FIELD OF THE INVENTION

The present invention relates to an in-vivo imaging device, system, and method to detect a frame sequence depicting/including a pathology, in an image stream captured in a body lumen.

BACKGROUND OF THE INVENTION

In vivo imaging procedures are performed in order to examine in-vivo organs, and diagnose different diseases/pathologies based on in-vivo images. Different pathologies may be detected in images, such as bleeding, adenoma, polyps, ulcers, abnormal growths or tumors that may project from a mucous membrane, for example the body lumen wall of the nose, the gastrointestinal (GI) tract, and the uterus. Colorectal polyps found in the colon or rectum of the GI tract may be known to be a precursor for colorectal cancer. The known long pre-malignant field of colorectal cancer and the known high survival rate after polyp removal may enable efficient prevention of colorectal cancer by systematic screening and timely removal of colorectal polyps. Manual screening procedures or methods, for example screening procedures to screen for colorectal polyps found in the colon or rectum, are known.

Manual pathology screening methods may include imaging a body lumen wall, for example, the entire length of the colon or the entire GI tract with a stream of image frames and manually reviewing (e.g., a doctor reviewing) the stream to detect and/or identify in one or more image frames showing any visible tissue changes to the membrane of the body lumen wall.

Devices and systems for performing in-vivo imaging, for example, of body lumen walls are known in the art. Such devices may include, inter alia, various endoscopic imaging systems, computed tomography (CT) devices, and x-ray imaging devices.

Typically, the stream of image frames captured during a pathology screening procedure, for example, a colorectal polyps screening procedure, may be lengthy so as to cover substantially the entire area of the GI tract, or specific areas such as the small bowel, colon or rectum. Manually reviewing all image frames may be tedious as well as undesirable and inefficient as a quick screening procedure to indicate the presence of pathology or to indicate the probability that pathologies may be present in a body lumen. In addition, the visibility of a pathology may be subtle and a health professional may miss one or more pathological findings when reviewing a lengthy stream of image frames.

SUMMARY OF THE INVENTION

An embodiment of the system and method of the present invention may enable automatic detection of a frame sequence depicting, including or containing a pathology (e.g., a same pathology), in an image stream captured in a body lumen. According to embodiments of the invention, a method to automatically detect a pathology frame sequence in an image stream captured in a body lumen is provided. The method may include receiving an image stream, the image stream comprising a plurality of image frames captured in the body lumen. A pathology score may be received or obtained (e.g., from an external or remote system) for at least a portion of the image frames, or for at least one image frame of the image frames. A seed frame which includes at least one pathology candidate (or is likely to include at least one pathology candidate) may be selected from the image stream, for example based on the received or obtained pathology score, and a (particular) pathology candidate may be selected from the seed frame, for example, for tracking.

A sequence of frames adjacent to the seed frame may be identified, the sequence including frames that depict, include or contain the (particular) pathology candidate selected from the seed frame. A pathology sequence score may be calculated for the seed frame based on the identified sequence of image frames. The pathology sequence score may be correlated to, or indicate or represent, the probability that a frame, or each frame, in the sequence of frames depicts, includes or contains the (particular) pathology candidate. In some embodiments, if the pathology sequence score is above a predetermined threshold, a processor may determine that the seed frame includes a pathology, or it may increase a pathology score of the seed frame.

In some embodiments, identifying a sequence of frames adjacent to the seed frame may include selecting a pair of consecutive images adjacent to the seed frame or to a previously selected pair, and tracking the pathology candidate as identified in the first consecutive image to the second consecutive image, to obtain a tracked pathology candidate in the second consecutive image. A degree of overlap may be determined between the pathology candidate in the first consecutive image and the tracked candidate in the second consecutive image. The pathology candidate with the highest degree of overlap may be selected as the pathology sequence candidate of the second image, and as the pathology candidate of the next selected pair of consecutive images. If the degree of overlap is lower than a predetermined threshold, an end of sequence for, related to or associated with the seed frame may be determined Determining a degree of overlap between pathology candidates may include calculating a Euclidian distance between a center of the pathology candidate in the first image of a pair of images and a center of the pathology candidate in the second image of the pair, calculating an area of the pathology candidate in the first image, and normalizing the calculated distance based on the calculated area of the pathology candidate in the first image.

In some embodiments, a subsequence of frames may be identified in each sequence, the subsequence including a plurality of contiguous frames that depict, include or contain the pathology candidate selected from seed frame. The subsequence may be identified by determining whether each frame of the subsequence received a pathology score which is higher than a predefined threshold, and/or if the area of the pathology candidate as identified or occupied in each frame of the subsequence at least partially overlaps with the area of the pathology candidate in the seed frame. Determining a subsequence may include, for each possible subgroup containing the seed frame in the sequence, calculating at least one of: mean of pathology scores calculated for the subgroup, a number of frames in the subgroup, and pathology score differences from edge of the subgroup. A subsequence score may be calculated for each image or image frame in the subsequence.

In some embodiments, identifying a sequence of frames adjacent to the seed frame may include tracking the pathology candidate along or in a sequence of frames adjacent to the seed frame. Frames in the defined, or identified, sequence may be clustered into clusters such that each cluster includes frames that depict, include or contain the pathology candidate captured in a position similar to the position of the pathology candidate in the selected frame. A cluster score or weight may be assigned to each frame in the sequence, the cluster score calculated based on the number of frames in the cluster to which the frame belongs. The pathology sequence score may be calculated based on the cluster score and/or the subsequence score.

BRIEF DESCRIPTION OF THE DRAWINGS

The present invention will be understood and appreciated more fully from the following detailed description taken in conjunction with the drawings in which:

FIG. 6 is a flow chart of a method for finding a contiguous subsequence of frames depicting a pathology candidate according to embodiments of the present invention; and FIG. 7 is a flow chart of a method for calculating a pathology sequence score for an in vivo image, and for adapting a display method based on the calculated score.

Figure 1:
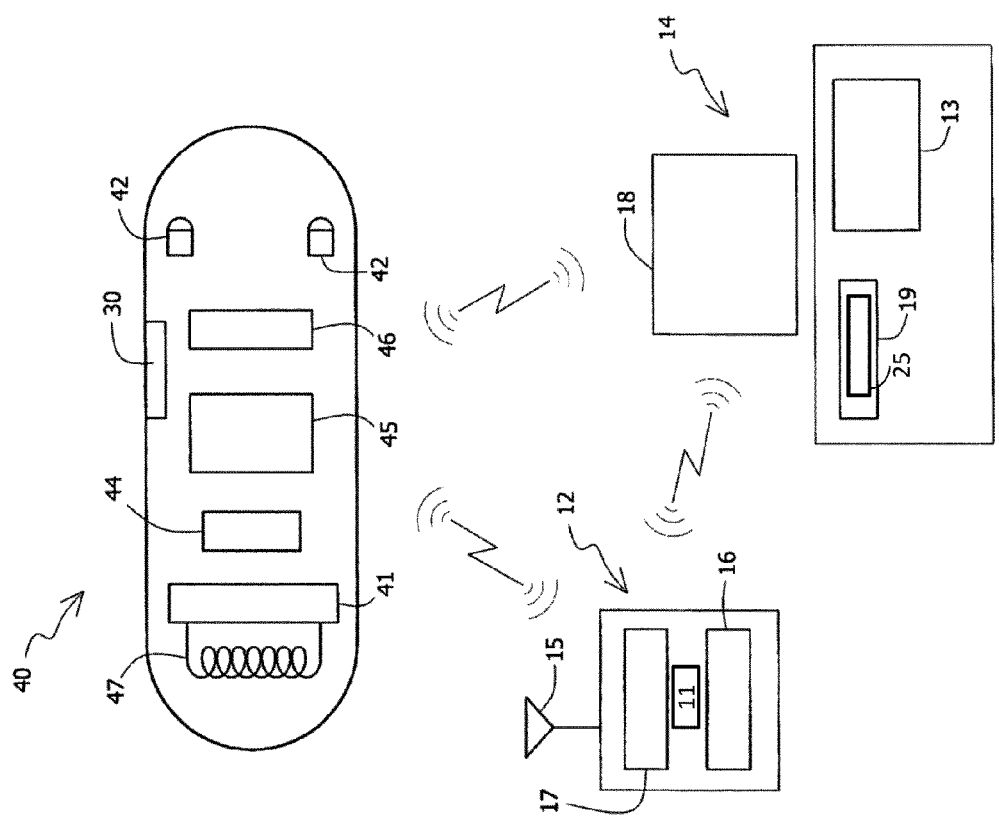
FIG. 1 shows schematic illustration of an in-vivo imaging system according to an embodiment of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing", "computing", "storing", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Different pathologies may be detected in an in vivo image stream captured by an imaging device, for example automatically detected by a system, or manually by a user reviewing the image stream. Pathologies which may be sought may include polyps, ulcers, adenoma, cancerous or malignant growths, tissue abnormalities and bleeding. A colorectal polyp may be an important precursor to colon cancer. This benign lesion typically may protrude from the wall as a small, sloped mound and may be seen in a two dimensional image as a circular or elliptical form. The known long pre-malignant stadium and the known high survival rate after polyp removal may enable efficient prevention of colon cancer by systematic screening and timely removal of colorectal polyps.

Embodiments of the present invention include a system and method for detecting a sequence of in vivo image frames depicting, including or containing the same pathology, for example by providing a system and method for automatically (e.g. without a user intervention and/or by a computer processor) identifying, detecting, selecting, and marking sequences of image frames captured in the GI tract that may indicate the presence of a pathology. The selected image frames may be, for example, displayed to a health professional for diagnosis, and the system (e.g., a computer system) may output, for example to the health professional, for example based on a calculated pathology sequence score, an indication regarding probable presence of a pathology. According to one embodiment of the present invention, an autonomous in-vivo imaging device, for example an imaging device in the form of a swallowable capsule, may capture a series of image frames of a body lumen as well as other information from within or along a body lumen, and may transmit the captured images and other information to one or more external units. Analysis of the transmitted data may be used to automatically and/or by machine select and mark image frames that may be candidates for pathology sequence identification. Analysis and processing of the data may be performed automatically without user intervention. Machine selection, detection and/or marking of image frames that may be, or form, pathology candidate sequences may be performed at least partially by a pathology sequence detector, and such that user intervention in the detection of frame sequences that include a pathology candidate may not be required, though possible. Machine selection, detection and/or marking (for example of the image frames) may be performed (collaboratively or not) by, for example, one or more processors, a workstation, circuitry, a sensor or any other computation and/or sensing able device. Images selected based on a calculated pathology sequence score may be displayed to a health professional for diagnosis.

A score or rating, which may be associated with, or calculated for, an image frame, is a measure that may indicate or signify the probability or correspondence of the frame in relation to a predetermined set of features. Scoring or rating frames may be performed in real time, or on the fly, such that each image frame to be scored is scored by the time the next image frame to be scored is captured or transmitted by the in-vivo device, or by the time the next image frame to be scored is received at the external system, or by any time between these times.

Image data and related non-image data (e.g., metadata) that may be contained in each image frame may be analyzed, and a set of features characterizing the pertinent or associated frame and/or image, or part thereof, may be extracted. Non-image data may be related to image data by, for example, describing the image data, including information on the capture of the image data (e.g., time, device or capsule type or identification, frame order or number, position or location of the device or capsule when capturing the frame) or other information related to the image frame or image. The set of features may be evaluated, the evaluation process producing a rating or score, which is referred to herein as a "frame score", for the pertinent image frame. The set of features may be selected or devised such that a sequence of image frames depicting, including or containing a candidate pathology (e.g., the same candidate pathology) is made apparent or obvious, and detectable by examining (or by virtue of), or using, the calculated score. The scores may be calculated by a processor configured to evaluate the frames, and may be stored in a storage unit, e.g. as metadata, along with the image frames, or in a separate storage unit which may be operaionally connected to the image frames storage unit.

Various predetermined sets of features may be used, and multiple scores may be assigned to an image frame, with each score indicating the correspondence or correlation of the frame to a certain predetermined set of features. For example, a pathology score may be a score or rating per frame, that correlates to, or indicates or represents, the probability that the image frame depicts or includes a pathology. A pathology sequence score may be a score or rating per frame, correlated to or representing a probability that each frame in an identified sequence of frames surrounding (e.g., adjacent to) the frame depicts, includes or contains the same pathology candidate.

Reference is made to FIG. 1, which shows a schematic diagram of an in-vivo imaging system according to an example embodiment of the present invention. Typically, the in-vivo imaging system may include an in-vivo imaging device 40, an external receiving device and/or recording device 12, e.g. data receiver, and a workstation 14. In-vivo imaging device 40 may have an imager 46 for capturing image frames or a stream of image frames, an illumination source 42 for illuminating the body lumen, a power source 45 for powering device 40, a processor 44 for processing data and commands communicated to and from device 40, and a transmitter 41 with antenna 47 for transmitting image, and possibly other data, to external receiver 12. In some embodiments of the present invention, in-vivo device 40 may include one or more sensors 30 in addition to imager 46, for example, temperature sensors, pH sensors, pressure sensors, blood sensors, tracking sensors, etc. Imager 46 may be a CCD or CMOS imager, or may be another solid state imaging device or other imaging device. Illumination source 42 may include one or more light emitting diodes (LEDs) or other illumination sources. In some embodiments of the present invention, device 40 may be an autonomous device, a capsule, or a swallowable capsule. In other embodiments of the present invention, device 40 may not be autonomous, for example, device 40 may be an endoscope or other in-vivo imaging device.

In-vivo imaging device 40 may typically, according to an embodiment of the present invention, transmit information (e.g., images or other data) to external receiver 12 possibly close to or worn on/by a subject. Receiver 12 may include an antenna or antenna array 15 and a data receiver storage unit 16. Typically, antenna array 15 may pick up signals transmitted by device 40 or the transmitter 41 and antenna 47 of device 40. External receiver 12 may include one or more processors 17 for processing image data or other data. Receiver 12 (and/or device 40) may include a localization unit 11, for determining the location of an autonomous in-vivo imaging device 40 over time. For example, localization unit 11 may track the location or position of device 40 in three-dimensional space over time and/or may track the distance, for example the distance over time, that device 40 traveled through the GI tract or through a specific organ in the GI tract over time. Localization unit 11 may be similar to various embodiments described, for example, in US Patent Application Publication No. 2002/0173718 published on Nov. 21, 2002 and U.S. Pat. No. 7,596,403 issued Sep. 29, 2009 both of which are assigned to the common assignee of the present application and incorporated herein by reference in their entirety. Other known localization units or methods of determining the location of a device may be used. In other embodiments, the localization unit 11 and/or part of its functionality may be included in device 40.

Receiver 12 may take on other suitable configurations and may not include an antenna or antenna array. In one embodiment of the present invention receiver 12 may, for example, include an LCD or other display for displaying image data or other data, e.g. location data, an indication signal, report, etc. regarding probable presence of a pathology, or another indication that a seed frame includes or contains a pathology, etc. The indication signal, report, etc. may be output or issued based, for example, on a calculated pathology sequence score. In other embodiments, receiver 12 may be electrically connected, e.g. via wire, blue tooth, or wireless connection, to a display unit, e.g. display unit 18 or workstation 14, to display data transmitted by in-vivo device 40 and/or processed by processing unit 17, 44, or workstation 14.

In one embodiment of the present invention, receiver 12 may, for example, receive and store data from imaging device 40, e.g. an image stream data captured and/or processed by processor 17 and later transfer the received data to a workstation 14, such as a personal computer, laptop or other portable or stationary computing devices, where the data may be further analyzed, stored, and/or displayed to a user, e.g. a health professional. Typically, workstation 14 may include processing unit 13, data processor storage unit 19, a disk drive, input-output devices, and display unit 18 e.g. a monitor, although alternate configurations are possible. Processing unit 13 may typically, as part of its functionality, act as a controller controlling the display of data for example, image data or other data. In one example, processor 13 and/or processor 17 may be employed to adapt a display of the in vivo image frames according to pathology candidate sequences selected by a pathology sequence detector. In one embodiment, processor 13 and/or processor 17 may be employed to construct or generate a pathology screening movie, by selecting pathology sequences detected by the pathology sequence detector. Processor 13 and/or processor 17 may be configured to carry out embodiments of the invention for example by executing instructions or software stored in a memory.

Display unit 18 may typically be a conventional video display, but may, in addition, be any other device capable of providing image or other data. Instructions or software for carrying out a method according to an embodiment of the invention may be included as part of workstation 14, for example stored in memory 19. A pathology sequence detector 25 may detect in the image stream a sequence of frames that may depict, include or contain a pathology candidate. Pathology sequence detector 25 may be included in, or be a functional part of the functionality of processor 13, processor 44 and/or processor 17 (e.g., as with other units described herein, may have its functionality executed when a processor executes instructions) and/or may be included in a different processing unit which may be operationally connected to workstation 14 and/or display 18. In another embodiment, pathology sequence detector 25 may be included as part of the functionality of the solid state imaging device, e.g. imager 40. In yet another embodiment, pathology sequence detector 25 may be included as part of the functionality of an ASIC (application specific integrated circuit), for example an ASIC included in device 40. In one example, pathology sequence detector 25 may be a processor that executes a series of commands or an algorithm to detect a series of image frames, for example from a stream of image frames, that satisfy predetermined conditions or include certain features and/or parameters. Based on the detection, candidate sequence or sequences of image frames may be selected. Output from the pathology sequence detector may be transferred to display unit 18, or to a display unit that may be included in receiver 12 and/or to processing unit 13 or 17, by either wired or wireless communication. Processor 13 may, for example based on a signal or data it may receive from pathology sequence detector 25, output an indication, information, an alarm, or a report, etc. for example via or on display 18, regarding presence of a pathology in a seed frame.

A score, rating, or measure may be a calculated by pathology sequence detector 25, for example, for each image received by image receiver 12, or for selected images. For example, in some embodiments, images for processing, or to be processed, by pathology sequence detector 25 may be selected from a number of consecutive images (e.g., only one image of every 5 images may be processed) or from a set of images received within a predetermined time period (e.g. 1 minute). In some embodiments, pathology sequence detector 25 may generate a simplified representation (e.g., a derived value or rating, such as an integer 0-100) of more complex characteristics of an image or a portion of an image (e.g., criteria, such as, color variation, appearance of certain textural or structural patterns, light intensity of the image or portions thereof, etc.). A score may include any rating, rank, hierarchy, scale or relative values of features or criteria. Typically, a score is a numerical value within a certain range, for example, a number from 1 to 10, but need not be limited as such. For example, scores may include, for example, a letter (e.g., A, B, C, . . . ), signs or symbols (+, −), computer bit values (0, 1), the results of one or more decisions or conditions (yes, no), for example, indicated by the status of one or more computing flags. Scores may be discrete (non-continuous) values, for example, integers, a, b, c, etc., or may be continuous, for example, having any real value between 0 and 1 (subject to the precision of computer representation of numbers). Any interval between consecutive scores may be set (e.g., 0.1, 0.2, . . . , or 1, 2, . . . , etc.), and scores may or may not be normalized.

Scores for each frame, or for one or more portions thereof, may be stored with the frames in the same database (e.g., image receiver storage unit 16 or storage 19). The scores may be defined, e.g., in a header or summary frame information package, for example with the data in an initial image stream. Alternatively or additionally, the scores may be stored in a database separate from the images with pointers pointing to the images.

Figure 2:
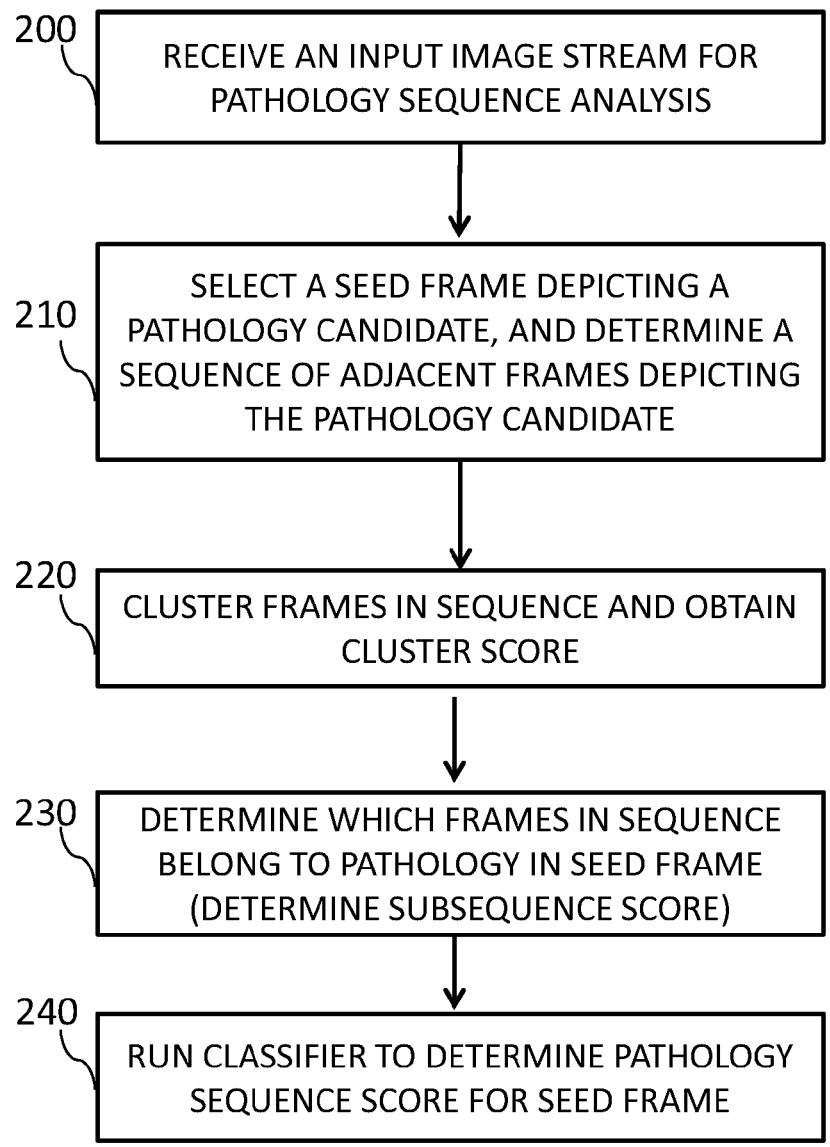
FIG. 2 is a flow chart of a method for determining a pathology sequence score for an in vivo image according to an embodiment of the present invention.

In one embodiment, pathology sequence detector 25 may assign a single combined score, e.g., a scalar value or rating, to each frame or group of frames based on predetermined criteria or operations, for example as described in FIG. 2. The score may indicate whether frames adjacent to the image depict, include or contain the same pathology candidate as the scored image. When discussed herein, a pathology candidate may be, or occupy, a portion of an image that depicts, includes or contains an in-vivo feature, or a tissue portion that may be or indicate a pathology or abnormality. Also when discussed herein, a pathology candidate may be an actual in-vivo feature or tissue portion which may be or indicate a pathology or abnormality. For example, a value '10' (ten) may be assigned to an image (e.g., image frame) that has adjacent frames that are suspected to depict, include or contain the same pathology candidate, while a value '0' (zero) may be assigned to an image that does not have an adjacent sequence of frames suspected to depict, include or contain the same pathology candidate. The "same" pathology candidate (e.g., as seen) in different frames may be depictions, in different image frames, of the same actual tissue portion suspected as being, or including, an abnormality or pathology. For example, the same pathology candidate may be viewed, though from different angles or directions, in multiple images captured by the imaging device, e.g. each image captured from a different angle or from a different distance of the imaging device from/to the imaged tissue, or from a different position of the imaging device in vivo. In another embodiment, pathology sequence detector 25 may assign a probability value to the image. For example, a value '53' may indicate that the detector calculated 53% probability or likelihood of the image to be part of a sequence of images that depict, include or contain the same pathology candidate. Other values may be calculated and assigned by pathology sequence detector 25.

The scores or measures may be absolute or relative to each other, and may be calculated based on a sequence of frames or on a single frame. The absolute score(s) for each frame or portion of frame may be a value associated with the criteria for the single frame. The relative score(s) for each frame or for a portion of a frame may be a change in the value associated with the criteria relative to the value associated with the criteria for a previous or a next adjacent or neighboring frame. Both absolute and relative scores may or may not be scaled (e.g., normalized). Scores may be scaled using different scaling factors, for example, for images captured in different frame capture rates.

In other embodiments, each of the various components need not be required. For example, the in-vivo device 40 may transmit or otherwise transfer (e.g., by wired communication) data marking sequences of image frames that may be candidates for pathology (e.g. polyp, ulcer, lesion, neoplasia, bleeding, etc.) identification directly to a viewing device or workstation 14. In one embodiment of the present invention, device 40 may only transmit selected image frames that may be included in pathology candidate sequences, or images which received a high pathology sequence score.

Devices according to embodiments of the present invention, including imaging, receiving, processing, storage and/or display units suitable for use with embodiments of the present invention, may be similar to embodiments of pathology detectors described in U.S. Pat. No. 7,986,337 entitled "System and Method for Editing an Image Stream Captured In-Vivo", U.S. Pat. No. 7,009,634 to Iddan et al., entitled "Device for In-Vivo Imaging", and/or U.S. Patent Application Publication Number 2007/0118012, entitled "Method of Assembling an In-Vivo Imaging Device", U.S. Patent Application Publication No. 2002/0177779 entitled "Method and System for Detecting Colorimetric Abnormalities In Vivo", and/or U.S. Pat. No. 8,423,123 entitled "System and Method for In-Vivo Feature Detection", each assigned to the common assignee of the present application and incorporated herein by reference. Of course, devices and systems as described herein may have other configurations and other sets of components. Devices, systems and methods according to some embodiments of the present invention may be similar to the commercial PillCam® SB2 or PillCam® Colon capsules and the associated data recorders and RAPID® workstation provided by Given Imaging, Ltd.

Other in-vivo systems, having other configurations, may be used. Of course, devices, systems, structures, functionalities and methods as described herein may have other configurations, sets of components, processes, etc.

In some embodiments of the present invention, an in-vivo image device 40 may be swallowed, or otherwise inserted within a gastrointestinal (GI) tract and may pass through the GI tract, for example, via natural peristaltic motion while capturing a series of image frames, e.g. capturing image frames periodically at two frames per second. In other embodiments of the present invention, the in-vivo imaging device may advance through the GI tract via other suitable means and may capture image frames at other suitable rates, for example, at variable rates. Image frames captured as well as other data may be transmitted externally for processing and display.

Data captured may be processed to automatically select image frames that may include pathology sequences or images which received a pathology sequence score which was higher than a predetermined threshold, or within a certain predetermined range. A high pathology sequence score may indicate that a pathology candidate identified in the analyzed frame was also identified and/or tracked in nearby adjacent frames, thus increasing the probability that the pathology candidate is indeed a pathology. If the pathology sequence score is low, it may indicate that the pathology candidate which appears in the frame was not identified or tracked in adjacent images, and this may indicate either that the pathology candidate may be a false alarm (e.g. a tissue fold which may have been incorrectly identified as a polyp by a polyp detector), or that the imaging device captured only a single image of the pathology candidate (e.g. due to fast motion of the imaging device). The pathology sequence score may be used to reduce false alarm rate of pathology detectors, and/or to increase the true positives detection rate of pathology detectors.

Pathology detectors, as referred to herein, may be or include one or more processors (as described herein) configured to detect an abnormality or a pathology in an image frame using image processing methods. One or more pathology detectors may be applied in accordance with embodiments of the present invention. A pathology detector may identify pathology candidates in an image. A pathology candidate may be, or occupy, an area in the image, which is suspected to be or include pathological tissue or abnormal features. The pathology detector may produce a score or rating which may correspond to the probability that the identified area/s indeed indicate a pathology.

In one example, a pathology detector may be a polyp detector. The polyp detector may identify polyp candidates in image frames, and may determine the polyp boundaries or areas in the image. Further, the polyp detector may calculate a pathology score or rating which corresponds to the probability that an identified candidate is indeed a polyp. In one embodiment, the pathology score may be received as input data, and stored in a storage unit. In another embodiment, the pathology score may be calculated by a processor as part of the pathology sequence score calculation. Similarly, other pathology detectors may be used, e.g. ulcer detector, blood detector, lesion detector, neoplasia detector, etc. Each detector may provide identified pathology candidates in an image being analyzed. A pathology score or rating may be provided per frame, the pathology score indicating (or corresponding to) a probability that an identified pathology candidate in an image is indeed a pathology. More than one pathology candidate may be identified in an image.

Frames which are adjacent to a seed frame may include for example a plurality of sequential frames or preceding frames captured as part of the original image stream by the imaging device. Adjacent frames may include a plurality of neighboring frames captured before and/or after the analyzed frame, in the original image stream. For example, each image frame in the original (e.g., raw) image stream may be assigned an ascending index number according to its capture time or order of capture (e.g. frame 1, frame 2, etc.). If an analyzed frame was assigned an index number 100, adjacent frames may include a plurality of frames which were captured immediately after, e.g. frames 101, 102, 103, etc. In some embodiments, adjacent frames may include a plurality of frames which were captured immediately before the analyzed frame, e.g. frames 99, 98, 97, etc. The maximum number of adjacent frames which may be analyzed in a sequence or determined as part of a sequence may be limited and predetermined, e.g. 20 frames, 40 frames, etc. In some embodiments, the number of preceding frames (captured immediately before the analyzed frame) may be limited to a predetermined maximum (e.g. 10 or 20), and/or the number of subsequent frames (captured immediately after the analyzed frame) may be limited to a predetermined maximum (e.g. 10 or 20). Other numbers or thresholds may be used.

Reference is now made to FIG. 2, which includes a flow chart of a method for calculating a pathology sequence score for an in-vivo image according to an embodiment of the present invention. In operation 200, a stream of in-vivo images may be received for pathology sequence analysis. The images may be captured, for example, by an in vivo imaging device such as device 40, and the images may be stored, e.g. in storage unit 19 and/or storage unit 16 for access of a processing unit (such as processor 13 and/or 17). A pathology score, calculated using a pathology detector such as a polyp detector or another detector which may be based on image analysis, may be stored along with the image frames, or may be received as an input to the pathology sequence score calculation. Methods and systems to implement a pathology detector may be found, for example, in U.S. Pat. No. 8,423,123, assigned to the common assignee of the present application and incorporated herein by reference. The pathology score may indicate presence or probability of one or more pathology candidates in an image frame. A polyp detector, for example, may detect presence of a predetermined geometric form, e.g. a substantially elliptical form, visible in the captured images. The predetermined geometric forms may be automatically detected by a polyp detector and may be classified based on at least one predetermined parameter, for example based on the color, size, and/or shape of the identified form. Polyp scores may be assigned to individual image frames, e.g. based on the number of identified forms detected in each image frame and based on its classification. In some embodiments, other or additional pathology detectors may be used, e.g. an ulcer detector, a blood detector, etc.

In operation 210, a seed frame or initiation/initial frame may be selected from the image stream, for example based on or using the pathology score, for pathology sequence analysis, and at least one pathology candidate may be detected in the seed frame. A seed frame may be a frame or image within the image stream. In some embodiments, each frame in the image stream may be selected (e.g., regarded) as a seed frame for pathology sequence analysis, while in other embodiments only certain frames may be selected (e.g., regarded) as seed frames. A processor, e.g. processor 13 and/or 17, may be configured to automatically select seed frames from the original image stream, or to determine which image frames will be analyzed as seed frames. In one embodiment, only frames which received a pathology score higher than a predetermined threshold, or frames which are determined to depict, include or contain at least one pathology candidate (or is likely to include at least one pathology candidate), may be selected as seed frames.

The image frames may be stored along with a pathology score (e.g. so the score is associated with the frames), the pathology score correlated or correlating to, indicating or representing a probability or likelihood that the image depicts, includes or contains pathology (e.g. that the captured image includes abnormal or pathological findings). The pathology score may be received as input to the pathology sequence detection, or may be calculated as part of the pathology sequence detection, e.g. processor 13 and/or 17 may be configured to calculate a pathology score for each seed frame. A sequence of frames, adjacent to the seed frame, may be determined or sought. Each frame of the sequence should depict, include or contain the same pathology candidate which was found in the seed frame. A method for defining or determining a sequence of frames around the seed frame is further described in FIG. 3.

In operation 220, frames in the determined sequence may be grouped or clustered into one or more clusters or groups. Each cluster may include frames of the sequence, not necessarily adjacent to each other within the sequence, in which the pathology candidate was captured from a certain angle. In each sequence, frames which are obtained from a similar or substantially identical position of the imaging device in relation to the pathology candidate are assigned to the same cluster. In some cases, a cluster may include a single frame from the sequence, while in other cases all images of the sequence may be assigned to a single cluster. In frames of or belonging to the same cluster, the pathology candidate may appear in a similar position (e.g., it may have similar image coordinates) within the image frame(s). An embodiment of a method clustering frames in the pathology sequence is further described in FIG. 5A. In some embodiments, each frame in the sequence may be assigned to a single cluster, while in other embodiment frames may be assigned to multiple clusters.

A cluster score may be calculated for each frame. For example, if each frame in the sequence is assigned to a single cluster, the cluster score may be calculated, per frame, based on the number of frames (from the sequence) which were assigned to the cluster. For example, a detected sequence of frames may include 20 frames, and the sequence may be divided into 4 clusters. By way of example a first cluster may include 1 frame, a second cluster may include 10 frames, a third cluster may include 6 frames and the fourth may include 3 frames. In one embodiment, the cluster score of a frame may be calculated as the inverse of the number of frames in the cluster which the frame belongs to. Thus, in the above example, the cluster score for the frame in the first cluster may be 1, the cluster score for each frame in the second cluster may be $\frac{1}{10}$, the cluster score for each frame in the third cluster may be $\frac{1}{6}$, etc. Other calculations may be used to determine the cluster score per frame, and frames assigned to a single cluster may receive different cluster scores in some embodiments. The cluster score may be used as a weight for calculating the frame pathology sequence score.

In operation 230, a subsequence score may be determined for each frame in the sequence. A subsequence may be detected, the subsequence including a contiguous subset of frames selected from the sequence. All frames selected for the subsequence may have a relatively high probability (or higher than a threshold), of depicting, including or containing the pathology candidate selected from the seed frame. A subsequence score may be calculated based on properties of frames in the detected subsequence. The subsequence score may be affected by the pathology score of frames in the subsequence and by pathology scores of other frames in the sequence, which may have not been selected or assigned to the subsequence. One example of a method for defining or determining a subsequence score for an image is described in FIG. 6. Other methods may be used to determine subsequence scores.

In operation 240, a classifier may be used to determine a pathology sequence score for the seed frame. The classifier may be trained based on frame sequences which were determined to include pathology sequences, and/or based on frame sequences which were determined to be false alarms, or determined to depict healthy tissue. The classifier may be a linear or a non-linear classifier, e.g. an SVM (Support Vector Machine) classifier may be used. Other methods of classification may be used. The output of the classifier may be a score which indicates if the pathology candidate in the seed frame appears also as a pathology candidate in adjacent or sequential frames.

The pathology sequence score of a seed frame may be correlated to or indicating a likelihood or probability that a sequence of images adjacent to the seed frame includes a pathology which was identified in the seed frame, and tracked or identified in the (e.g., other) image frames of the sequence.

The pathology sequence scores may be used by a processor or system to determine, for example, which frames of an image stream to display to a user, or it may be used to set the display time or display rate of an image frame sequence. Images which received a high pathology sequence score may be included in a summary image stream, or in other types of presentations of images which may include pathology (e.g. a matrix view of pathology candidate images, etc.). In some embodiments, the pathology sequence score may be used to improve detection results of a pathology detector. A processor may determine that a seed frame, for which a pathology sequence score was calculated, includes or contains a pathology (e.g., it may determine that a candidate pathology included in a seed frame is, indeed, a pathology), and output, for example display to a user, an indication regarding presence of the pathology in the seed frame and/or in a series of frames related to or associated with the seed frame.

Figure 3:
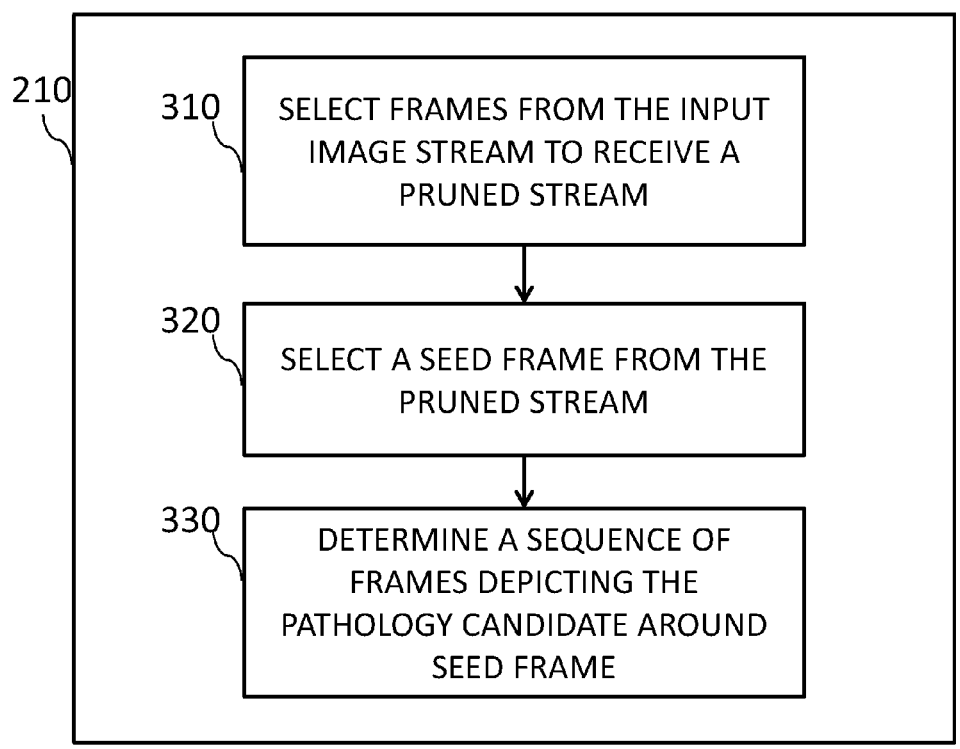
FIG. 3 is a flow chart of a method for determining a sequence of adjacent frames depicting a pathology candidate according to embodiments of the present invention.

Reference is now made to FIG. 3, which is a flow chart of a method for defining or determining a sequence of adjacent frames depicting, including or containing a pathology candidate, according to embodiments of the present invention. FIG. 3 includes operations which may be used, for example, to perform operation 210 of FIG. 2 herein; other operations may be used to perform operation 210.

In operation 310, frames may be selected for pathology sequence analysis from an input image stream, and a pruned or reduced stream may be obtained. The selection of frames may be performed according to various image parameters, for example, frames that are too bright or too dark may be removed, and frames which are blurred may be removed. In some embodiments, frames which depict/contain a certain amount of intestinal content or food remains may be pruned, since the visibility or detectability of pathologies in such frames may be quite limited. Other parameters may be used to select frames from the stream, in order to obtain a pruned stream for analysis. For example, in some embodiments, selection of frames from the stream may be based on a pathology score which was calculated using one or more pathology detectors, e.g. a polyp detector, a blood detector, an ulcer detector, etc. Frames which received a pathology score higher than a predetermined threshold may be selected for pathology sequence analysis, while frames which received a low pathology score may be removed from the stream to be analyzed. In some embodiments, only frames which have a calculated pathology score may be selected. In some embodiments, no selection may be performed, and the pruned stream used for pathology sequence analysis may include the complete or original image stream.

In operation 320, a seed frame may be selected for pathology sequence analysis from the pruned stream. (Selection of a seed frame may be performed based on or using a pathology score associated with, or received for, the related image stream.) The selection of the seed frame may be straightforward, e.g. every frame of the pruned stream (or the original stream in some embodiments) may be analyzed, for example sequentially according to the order of capturing the frames. Each selected seed frame has a pathology score, and at least one pathology candidate which may be identified in the frame by the pathology detector.

In operation 330, for each seed frame, a sequence of frames adjacent to the seed frame may be determined as a pathology sequence. An identified pathology candidate in the seed frame may be tracked in sequential adjacent or consecutive frames, e.g. in subsequent or preceding frames. If the pathology candidate (which was identified and/or selected in the seed frame) is found in a succeeding frame (and/or in a preceding frame), the sequence is continued, and the pathology candidate is sought in another next frame (and/or in a preceding frame). A method may include tracking the pathology candidate identified in a first consecutive image to a second consecutive image, to obtain a tracked candidate in the second consecutive image. This tracking process may be repeated until the pathology candidate is no longer identified in a next frame, or until no tracked candidate is found, or until a maximum limit/number of frames is reached. An exemplary method for tracking a pathology candidate in sequential image frames is further detailed in the flow chart and description of FIG. 4A herein.

Figure 4A:
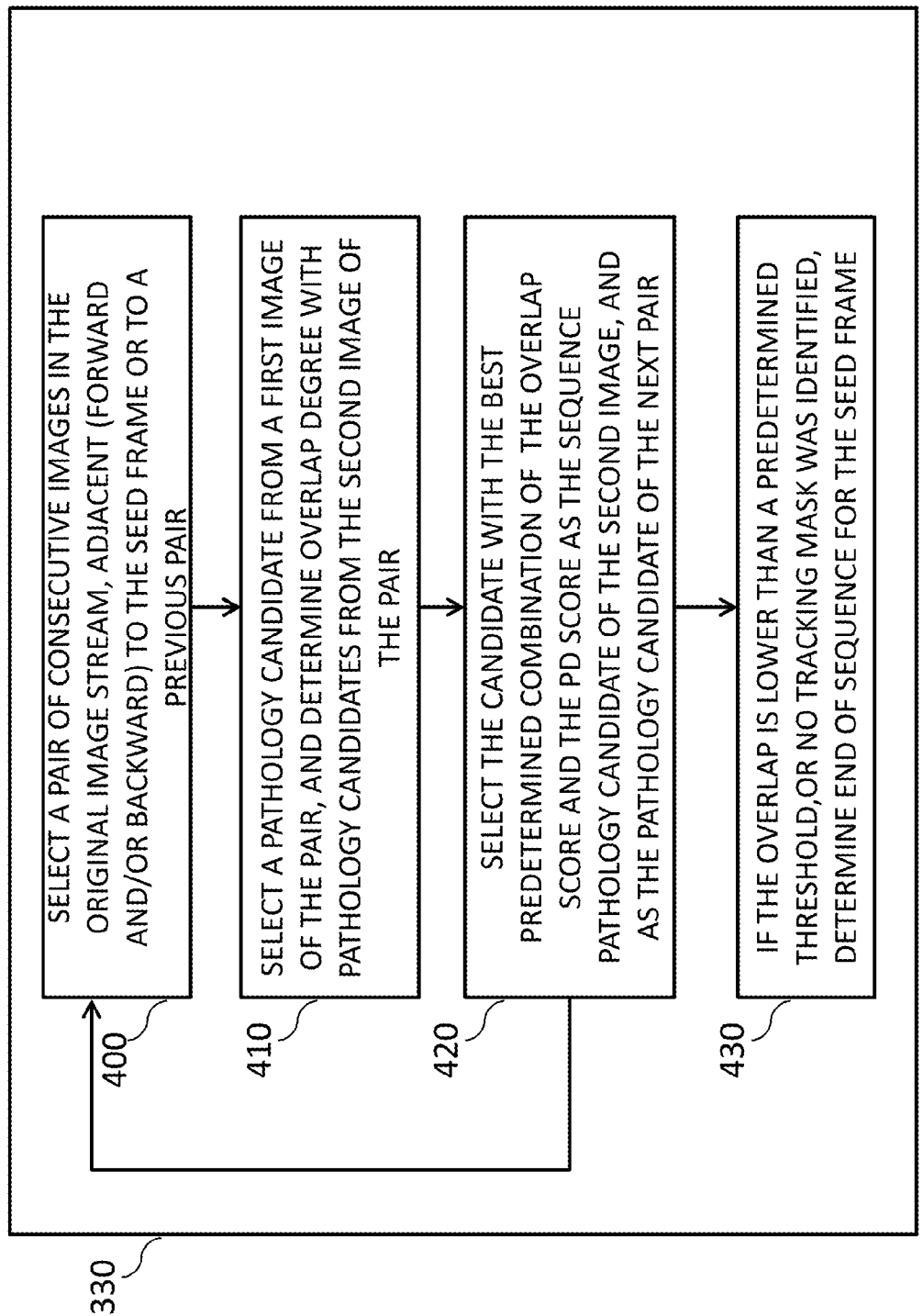
FIG. 4A is a flow chart of a method for determining a sequence of frames depicting a pathology according to embodiments of the present invention.

Reference is now made to FIG. 4A, which is a flow chart of a method for defining or determining a sequence of frames depicting, including or containing a pathology according to embodiments of the present invention. In operation 400, a pair of consecutive frames in the original image stream may be selected, the pair including the seed frame and an adjacent frame (which could be captured either before the seed frame or after it). The reason for choosing the pairs from the original image stream is that images may be removed during the pruning phase (e.g. as described in operation 310), and the images in the original image stream may typically include more data than the pruned stream.

Figure 4B:
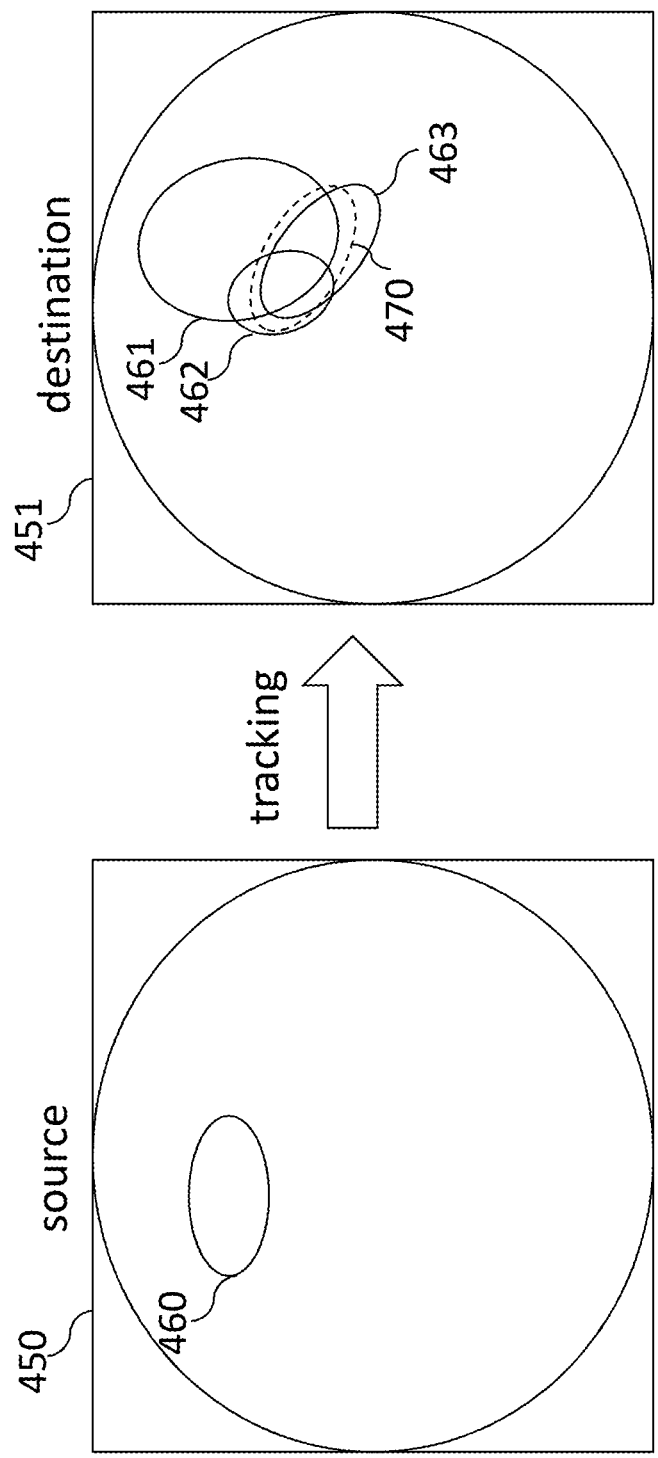
FIG. 4B is an example of tracking of a pathology candidate, identified in a first image, in a subsequent image, according to embodiments of the present invention.

In operation 410, a pathology candidate may be determined, selected or identified from the first image of the pair (e.g. the first image of the pair is the seed frame at the beginning of the analysis, and the next pairs are adjacent to the seed frame). A pathology candidate may be selected from a number of known pathology candidates, which may be received for example as part of the pathology score of the image. Pathology candidates may be obtained from the second image frame of the pair, for example using the pathology detector which provided the pathology score for the image. In some embodiments, the pathology candidates per image frame may be stored (e.g. along with the pathology scores, or separately) in a storage unit, e.g. storage 19, which may be accessed by a processor for performing tracking of pathology candidates from one image to the next. For example, FIG. 4B is an example of a pathology candidate 460 that is identified in a first image 450, and is tracked in a subsequent image 451. A pathology candidate identified in a first image, which is also identified in a second image, means the pathology candidate is tracked in or to the second image. The tracked candidate depicts the same pathological tissue or suspected area, but may have a different shape, color and/or position in the image. Since the imaging device may move between the time of capturing each image, the tracked candidate may be captured in a sequential image from a different angle than in the seed frame, or from a different position of the imaging device in relation to the pathology candidate. Thus, the same pathology candidate may appear similar in sequential image frames, e.g. if the imaging device captured it from a different imaging angle, and may be very similar if the imaging device and/or the in vivo tissue did not move (substantially) between the time of capturing the sequential images. The same pathology candidate may be identified by a pathology detector in each frame separately, and may be tracked by the pathology sequence detector.

The pathology detector produced three pathology candidates 461-463, shown in destination image 451. Pathology candidate 460 may be tracked, using a video tracking method, to an estimated position of tracked candidate 470 in the destination image. The tracked candidate 470 is the result of a video tracking algorithm which estimates the movement of specific points (e.g. which may be part of the pathology candidate but not necessarily) which may be correlated between the first image and the next image of the pair.

To perform video tracking of a target in an image stream, a processor may be configured to analyze sequential video frames and output the movement of targets (e.g. pathology candidates in this example) between the frames. There are various methods known in the art which may be used to perform video tracking, for example, blob tracking (segmentation of object interior e.g. blob detection, block-based correlation or optical flow), kernel-based tracking (also called mean-shift tracking, which is an iterative localization procedure based on maximization of a similarity measure), contour tracking (which allows detection of object boundary, e.g. active contours or condensation algorithm), and/or visual feature matching using registration methods (e.g. for each consecutive pair of images, a tracking algorithm based on affine transformation may be used to estimate where the pathology candidate is located in the next image).

Tracking the pathology candidate may be performed along or in a sequence of frames adjacent to the seed frame. The tracking operation may include determining whether the pathology candidate selected in the seed frame or in a previous frame, is identified in the next frame. In some embodiments, the tracking operation may continue by adding pairs to the sequence, until the tracking operation fails, e.g. until no tracking candidate is identified in the next image. In other embodiments, the tracking operation may be performed until a maximal number of images (or a maximal sequence length) is reached, for example up to 20 consecutive image frames in the original image stream. Other numbers of consective image frames may be used.

A degree of overlap between the area or position of pathology candidates 461-463 and the area or position of tracked candidate 470 in the destination image 451 may be determined. For each image, all the pathology candidates, obtained by the pathology detector, are stored or received. The candidate with the highest overlap score is defined as the pathology sequence representative of the destination image, and is defined as the pathology candidate to be tracked in the next pair of adjacent images. To determine the degree of overlap between a pathology candidate in the source image and a tracked candidate in the destination image, the size or area of each candidate may be determined, and the difference between the areas may be calculated. The size or area of each candidate may be determined based on, for example, the number of pixels that it captures in the image frame. In one example, the degree of overlap between a pathology candidate in a source image and a tracked candidate in the destination image may be calculated by calculating the number of pixels in the area of the pathology candidate which overlap with pixels of the tracked candidate area, and dividing the result by the total number of pixels which belong to at least one of the pathology candidate area and the tracked candidate area. This calculation may be performed, for example, by assigning a value of zero (0) to pixels which are not included in the area of the pathology candidate, and assigning a value of one (1) to pixels which are included in the area of the pathology candidate. Similarly, the value of zero (0) may be assigned to pixels which are not included in the area of the tracked candidate, and a value of one (1) may be assigned to pixels which are included in the area of the tracked candidate. Values other than 1 and 0 may be used to mark pixels. An AND operation may then be performed using the assigned value of each pair of pixels located in the same position in both images, and the results may be summed and the result may be divided by the result of an OR operation performed on the assigned values of the pixels. For example, the following calculation may be performed:

$$\text{overlap}(M_1, M_2) = \frac{\sum_{i,j}(M_1(i,j) \& M_2(i,j))}{\sum_{i,j}(M_1(i,j) | M_2(i,j))}$$

wherein overlap($M_1,M_2$) indicates the overlap degree between images $M_1$ and $M_2$, and i, j are the coordinates of pixels in the images. $M_1(i,j)$ indicates the assigned value (e.g., 0 or 1 as described above) of the pixel (i,j) in image $M_1$, and $M_2(i,j)$ indicates the assigned value of the pixel (i,j) in image $M_2$.

If the calculated overlap degree is lower than a predetermined minimum threshold, e.g. less than 50% or 40% of the tracked candidate's size or area overlaps with the pathology candidate's area, the tracking operation ends for the current pair of images selected in that direction (e.g. forward or backward in the image stream from the seed frame), and no new pair is selected (e.g., the sequence is terminated for the selected direction). Other thresholds may be used.

The tracking operation may be performed both in a 'forward' direction (e.g., using the seed frame and sequential frames which were captured after it in time), and/or in a 'backward' direction, e.g. using the seed frame and sequential frames which were captured before it in the imaging procedure. In some embodiments, the tracking operation may be performed for a predetermined maximum amount of frames, e.g. the seed frame and 10 or 19 frames before it and after it. Setting a fixed maximum number of frames in a sequence may improve the operation time.

In operation 420, a pathology candidate is selected in the destination image frame. The pathology candidate may be determined by selecting the pathology candidate (obtained from the pathology detector) which has the best combination of (1) overlap degree between the pathology candidate and the tracked candidate, and (2) high pathology score (or a derivative of the pathology score). In the example of FIG. 4B, pathology candidate 463 may be determined as the best match to the tracked candidate 470 and also as the candidate with the highest pathology score. The selected pathology candidate is defined as the pathology candidate representative in the current pathology sequence, and is used as the pathology candidate in the next pair of adjacent images selected from the original image stream.

Operations 400-420 are repeated or iterated until the sequence is terminated in operation 430. Termination of the sequence, or of one direction of a tracking sequence (e.g. forward or backward tracking), may be performed after reaching a maximum number of frames allowed in a sequence, and/or due to failure of the tracking procedure (e.g. or no tracked candidate was found in the next image), and/or due to failure of the pathology detection (e.g. no pathology candidate with sufficient overlap was found in the next image). The result of these operations (400-430) is a sequence of images before and/or after the seed frame, all of which include (with a certain probability) the pathology candidate selected in the seed frame. For example, if the maximum number of frames in one direction of a sequence is 10, the maximum number of frames in a sequence is 21 (including the seed frame, and 10 frames before and after it). Other numbers or thresholds may be used.

Figure 5A:
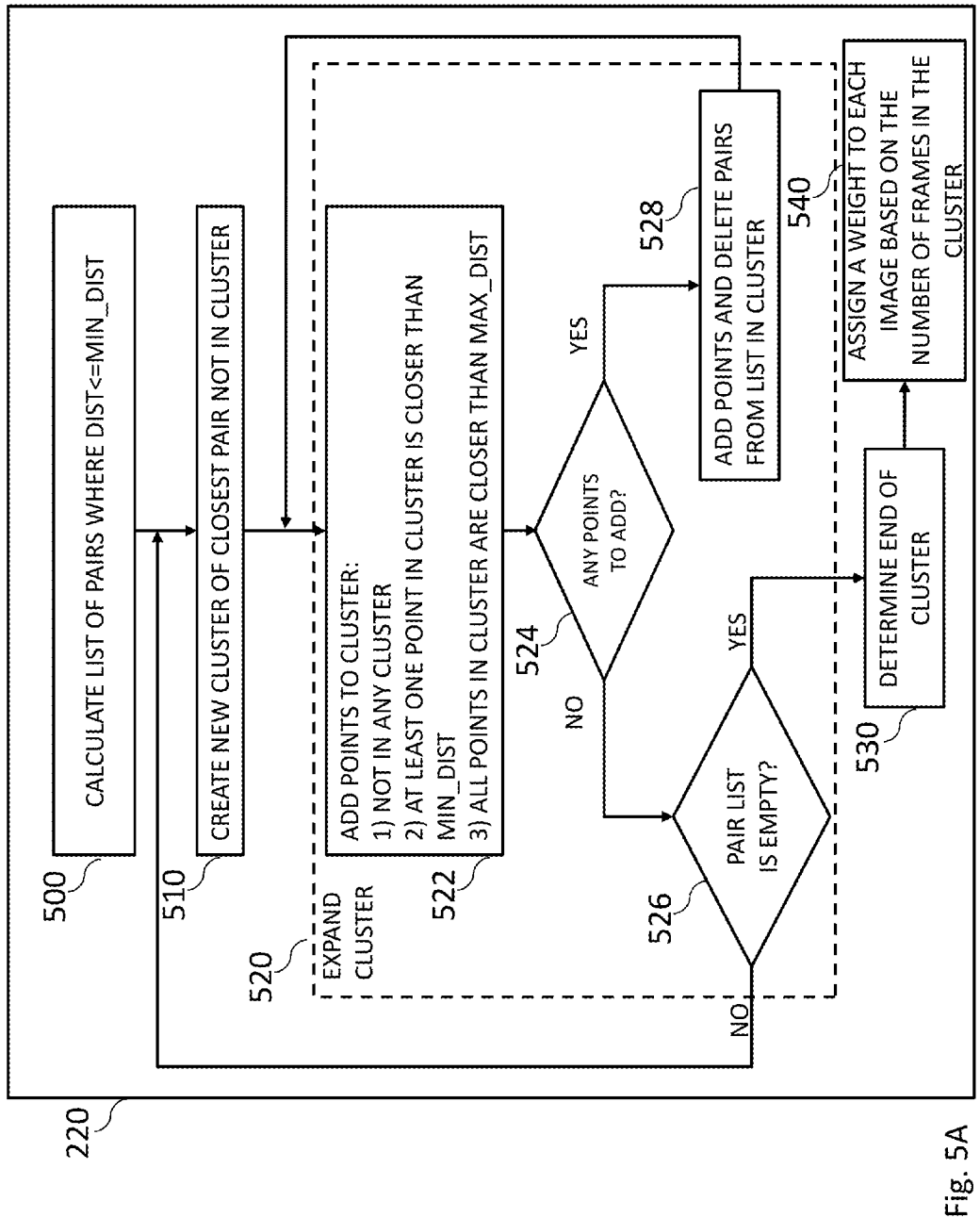
FIG. 5A is a flow chart of a method for determining clusters in a sequence of frames depicting a pathology, according to an embodiment of the present invention.

Reference is now made to FIG. 5A, which is a flow chart of a method for clustering a sequence of frames depicting, including or containing a pathology candidate, according to an embodiment of the present invention. This method may be used, for example, in operation 220 of FIG. 2; other operations may be used for performing operation 220. A cluster of images includes image frames which depict, include or contain the pathology candidate selected in the seed frame, captured from a similar or nearby angle of the imaging device. In order to determine which images belong to a certain cluster, the following operations may be used.

In operation 500, a list of image pairs is calculated, where the distance between pathology candidate centers determined in each image is smaller than (or equal to) a minimum distance threshold. The pathology candidate center may be determined, for example, in the center of a circle or an ellipse which best fits the pathology candidate in each image, or a circle with the same area (in pixels in the image) as the pathology candidate. In some embodiments, the Euclidian distance between the centers of the circle (or ellipse or other shape) representing the pathology candidates may be normalized, e.g. using a value based on the radius of the pathology candidate (e.g. radius of circle with the same area or same number of pixels). Normalizing the distance may assist in clustering images in which the pathology candidate is relatively large, and its movement in the adjacent image may be relatively large compared to a small movement of a pathology candidate which is quite small. This enables more efficient computation using predetermined distance thresholds. For example, a shift of 10 pixels is relatively near for a pathology candidate of radius 100 pixels, but relatively far for a pathology candidate of radius 10 pixels.

In operation 510, a new cluster is created, using the pair of image frames (which are not yet in any cluster) with the closest distance between pathology candidates' centers.

In operation 520, the cluster may be expanded by adding more images to the cluster. In operation 522, one or more of the following conditions may be checked before adding an image to a certain cluster:
(1) if the image is not in any other cluster,
(2) if at least one point in the cluster is closer than the minimum distance threshold, and
(3) if all points in the cluster are closer than a maximum distance threshold.
The minimum and maximum distance thresholds may be predetermined, for example empirically. In one embodiment, the minimum distance threshold may be set to 0.2, and the maximum distance threshold may be set to 0.6. Other numbers and thresholds may be used.

In operation 524, if there are no more images to add to the cluster and the pair list is empty (operation 526), the end of the cluster is determined. If the pair list is not empty, operations 510-526 are repeated. If there are more images to add to the cluster, these are added and removed from the pair list in operation 528. The cluster is then further expanded (operation 520 is repeated).

After determining the end of the cluster, in operation 540, each frame in the cluster is assigned a weight, equal to the inverse of the number of frames in the cluster. If image is not in any cluster (i.e., the image is a separate cluster including only that image), the weight is equal to 1.

Figure 5C:
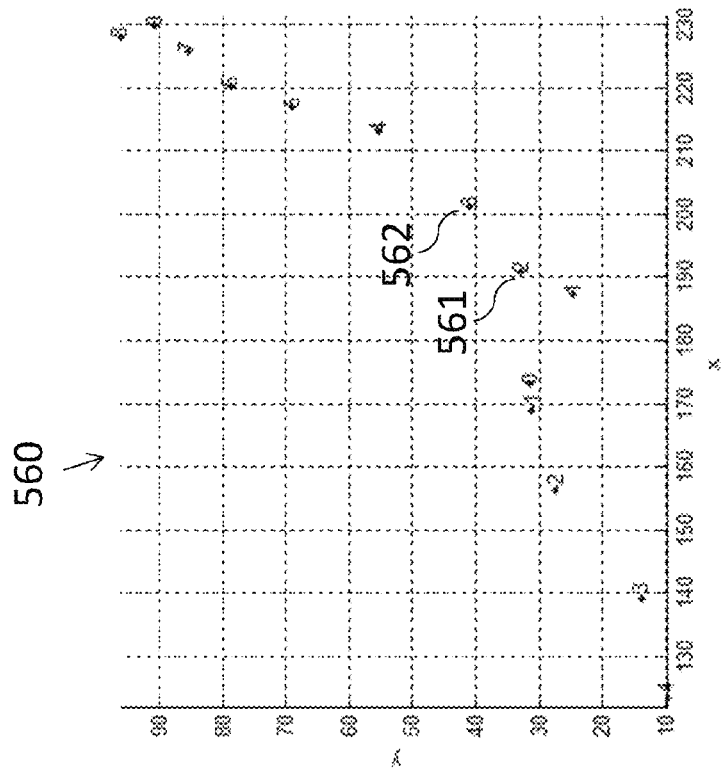
FIGS. 5C and 5E are exemplary results of determined clusters in an identified pathology sequence according to an embodiment of the invention.
Figure 5B:
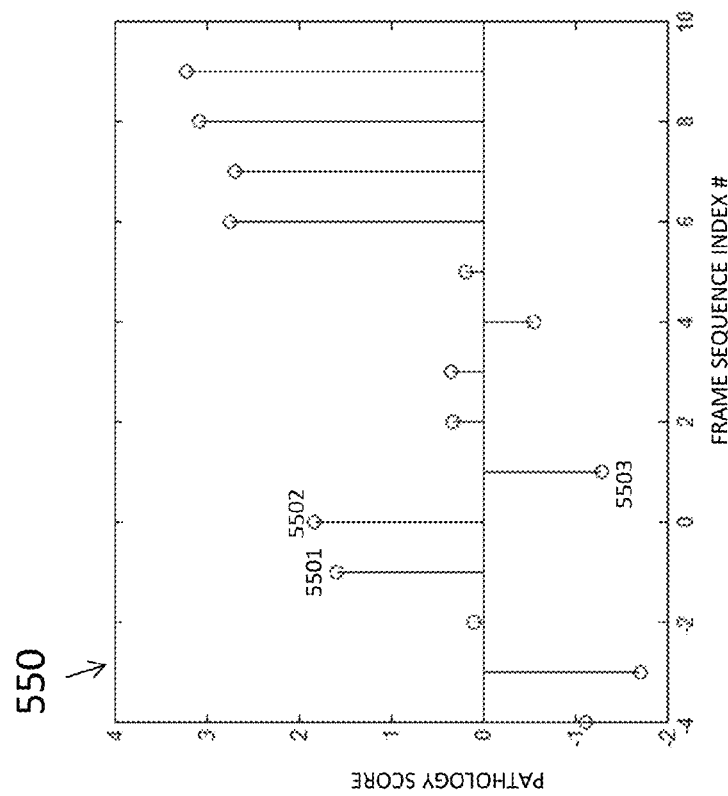
FIGS. 5B and 5D are exemplary results of pathology scores received for an identified pathology sequence according to an embodiment of the invention.
Figures 5D, 5E:
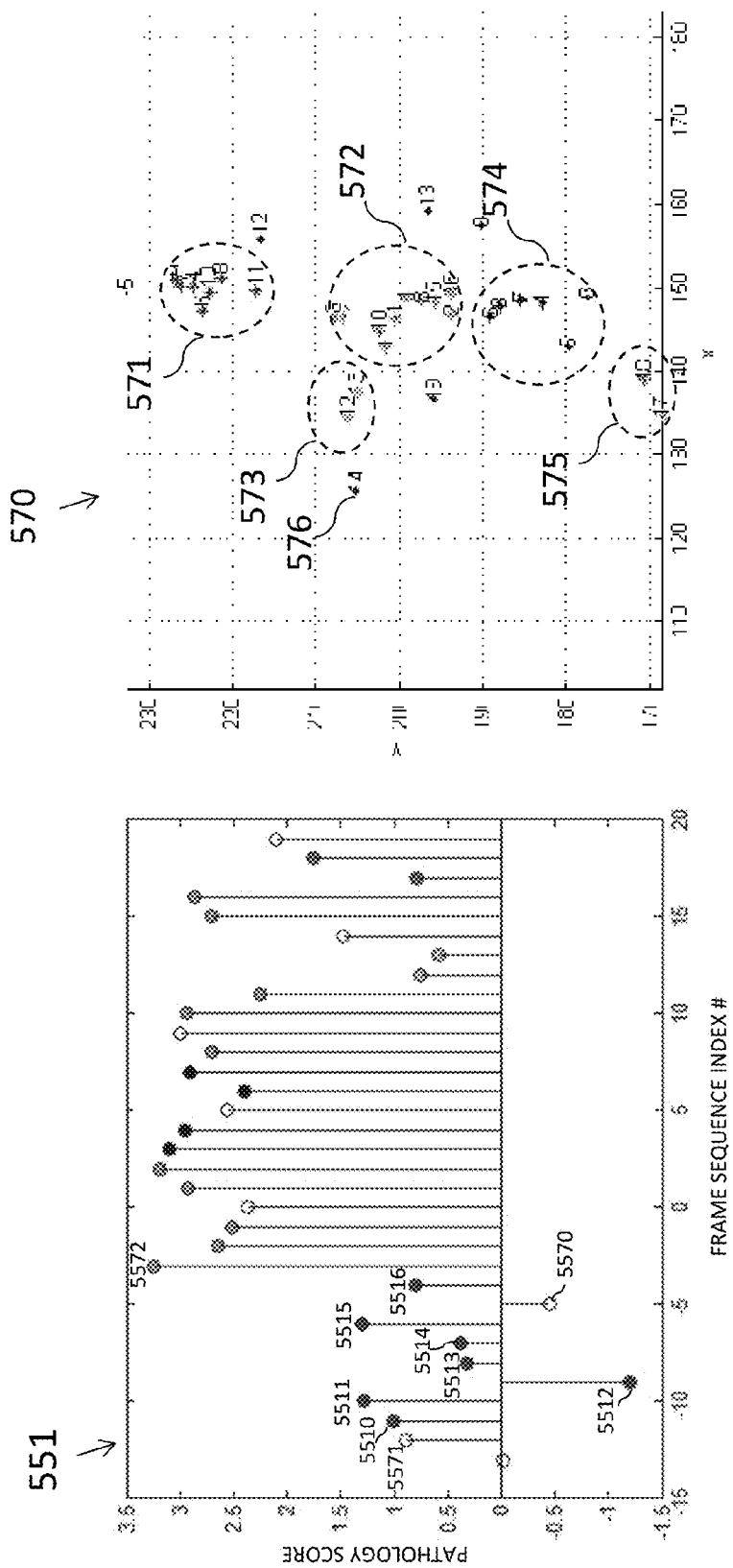

Reference is now made to FIGS. 5B and 5D, which are exemplary results of pathology scores received for an identified pathology sequence according to an embodiment of the invention. Y axis indicates the pathology detector scores, as received or obtained by a pathology detector. X axis indicates the frame index number in the identified pathology sequence. In graph 550 of FIG. 5B, the seed frame is indicated by index number 0, and the sequence includes four frames before the seed frame (frame sequence index #-4) and nine frames after the seed frame (frame sequence index #9). No clusters were found in this example, e.g. points 5501, 5502 and 5503 are each in a separate cluster, and thus the cluster score for each image in this sequence is equal to 1.

In graph 551 of FIG. 5D, the seed frame is again indicated by index number 0, and the sequence includes 13 frames before the seed frame (frame sequence index #-13) and 19 frames after the seed frame (frame sequence index #19). The maximum allowed number of frames in each direction of this sequence calculation was set to 19. Points 5510-5516 were assigned to a single cluster, and points 5570, 5571 were assigned to other clusters. Thus, each frame which belongs to the cluster of 5510-5516 may be assigned a cluster weight of, for example, $\frac{1}{7}$. In other embodiments, each image frame in a cluster may be assigned a cluster score which equals the maximum pathology score of the pathology candidate in the cluster. Other methods may be used to compute the cluster weight (or cluster score) of an image frame.

FIGS. 5C and 5E are exemplary results of determined clusters in an identified pathology sequence according to an embodiment of the invention. Graph 560 of FIG. 5C corresponds to the sequence shown in FIG. 5B, and graph 570 of FIG. 5E corresponds to the sequence shown in FIG. 5D. In graph 560, no clusters were determined, and each point (representing a frame in the sequence) in the graph, e.g. point 561 or 562, is assigned to one cluster.

The X axis of FIGS. 5C and 5E is the pixel's X coordinate in the images, and Y axis is the pixel's Y coordinate in the images. It is noted that five clusters 571-575 of multiple frames were detected in graph 570, and the rest of the clusters, e.g. 576, include a single image frame in each one.

Reference is now made to FIG. 6, which includes a flow chart of a method for finding a contiguous subsequence of frames surrounding the seed frame, which depict, include or contain a pathology candidate according to embodiments of the present invention. The method may be used, for example, in operation 230 of FIG. 2; other operations may be used for performing operation 230.

A sequence may follow or track tissue in an image, even after the pathology candidate disappears (e.g. shrinks, is blocked by an occlusion, etc). Even if there are pathology frames in a sequence, they may be mixed with (e.g., interspersed between) non-pathology frames. In order to determine a pathology sequence score, a contiguous subgroup of frames surrounding the seed frame and including or containing the pathology candidate selected in the seed frame, may be determined In operation 600, for all possible subgroups of frames which include the seed frame in a sequence, a subsequence which best satisfies one or more of the following conditions (or features) may be sought:
1. High combination of pathology scores of the frames in the subsequence—the combination may be computed, for example, as an average of pathology scores, a mean of pathology scores, or another linear or non-linear combination of the pathology scores of frames in the subsequence.
2. Large or significant decrease in pathology scores from frames on each side of the subsequence to the next adjacent frame—for each subsequence, a large or significant difference is sought between the pathology scores of the last frame of the subsequence and the nearest adjacent frame in the sequence. For example, in FIG. 5D, there is a significant decrease between the pathology score of frame 5572 (which has a pathology score of 3.25), to the pathology score of frame 5516 (which has a pathology score of 0.9).
3. Long subsequence—a longer subsequence may indicate more frames which depict, include or contain the pathology candidate, and therefore should receive a higher subsequence score.

The number of possible subsequences reaches a limited number if a maximum threshold number of frames is allowed in a sequence. In operation 610, a subsequence score may be calculated per frame (or per subsequence, and assigned to all frames in the subsequence), based on one or more parameters as indicated in the above conditions, e.g. based on mean pathology detection scores, amount of frames in the subsequence (length of subsequence), and/or pathology score differences from an edge of the subsequence to the next adjacent frame in the sequence. A predetermined weighted combination of these parameters may be formulated to calculate a subsequence score. In some embodiments, the subsequence score per frame may be based on the order of the frame in the subsequence—for example, a frame in a subsequence, which is distanced, say, 3 frames from the seed frame, may receive a weight which equals 3. In an example embodiment, the subsequence score per frame may be calculated as follows:

$$\text{Subsequence Score} = C_1 * (\text{mean of pathology scores in subsequence}) + (\text{mean}[\text{pathology score of frame previously adjacent to susbsequence, pathology score of frame subsequently adjacent to susbsequence}]) + C_2 * (\text{distance of frame from seed frame})$$

wherein $C_1$ and $C_2$ may be predetermined constant values, e.g. in one embodiment $C_1 = 1.15$ and $C_2 = 0.025$. ($C_1$ and/or $C_2$ may have other values.) If the adjacent frame is not within the sequence, a predetermined fixed score, e.g. score of −1.5, may be assigned to the frame.

In operation 620, the subsequence with the maximum subsequence score is selected, and this subsequence provides the best contiguous subsequence of frames (which surround the seed frame), wherein each frame depicts, includes or contains the pathology candidate which was selected in/from the seed frame.

Reference is now made to FIG. 7, which is a flow chart of an exemplary method for calculating a pathology sequence score for an in vivo image, according to embodiments of the present invention. In operation 700, a sequence of images may be obtained for a seed frame, for example as described in connection with FIG. 3 and in FIG. 4A. For each possible subsequence (which is a contiguous subgroup of frames in the sequence), operations 710-730 may be performed.

In operation 710, a linear combination of pathology scores received for the frames in the sequence may be calculated. The linear combination may include multiplying each frame's pathology score by a weight which is based on a frame cluster score, and summing the result. The frame cluster score may be calculated, for example, as described in FIG. 5A herein.

In operation 720, the mean of the pathology scores may be calculated for each subsequence. In operation 730, the mean of pathology scores may be multiplied, for each pathology candidate in a frame, by a candidate rank. The candidate rank in a frame may be a weight assigned to a pathology candidate in an image. The candidate rank may be calculated based on the candidate's position in an ordered list which includes all the candidates in a frame, ordered according to their pathology score. For example, candidate rank may be calculated as the inverse of the position of the candidate's pathology score in an ordered list which includes all pathology candidates identified in the seed frame, arranged in descending order. For example, for a frame with a single candidate, the candidate rank is always 1. In another example, for a candidate which received the $7^{th}$ highest pathology score in the frame, the assigned candidate rank may be $1/7$. Other methods may be used to calculate the candidate rank.

In operation 740, a trained classifier may be employed to compute a pathology sequence score for the seed frame. The trained classifiers may produce a grade or rating for each pathology candidate based on for example property vector or other property list built or created for that pathology candidate. Trained classifiers may be linear or non-linear classifiers trained by supervised learning methods such as neural network classifiers, Fisher linear discriminant classifiers, sparse network of Winnows classifiers, decision tree classifiers, Bayes classifiers, support vector machines, AdaBoost classifiers, etc. Alternatively, other learning techniques and/or classifiers may be used. A trained classifier may include a set of instructions that may be executed by a processor (e.g. processor 13 and/or 17), and may be stored in a storage unit operationally connected to the processor, e.g. storage 19 and/or 16.

In operation 750, the pathology sequence score may be used, for example, to adapt a display method of the image stream. For example, the original image stream may be summarized, and the images in the summarized stream may be selected based on the pathology sequence scores. In other examples, frames depicting, including or containing the same pathology may be displayed to a user, for example in a screening procedure, to assist in determining whether the pathology candidate is indeed a pathology (e.g. true positive) or a false alarm (e.g. false positive).

In another example, pathology scores may be amended or improved based on the pathology sequence score. For example, if the pathology sequence score indicated a low probability of adjacent frames depicting, including or containing the pathology candidate, a relatively high pathology score may be regarded as a false alarm, and may be reduced or ignored. In some embodiments, the speed of the imaging device may be estimated, e.g. using capsule tracking data which may be available, or adjacent frame differences, and if the speed of the capsule is determined to be relatively high, the pathology score may not be removed or ignored. Additionally or alternatively, if the pathology sequence score indicated a high probability of adjacent frames depicting, including or containing the pathology candidate, the pathology score may be increased or given a stronger weight. Similarly, false negative occurrences of the pathology detector may be reduced or identified. If the pathology score indicates a low probability of the image depicting, including or containing a pathology, but the pathology sequence score indicates a high or relatively high probability that the image depicts, includes or contains a pathology, it may be determined that the pathology detector provided a false negative result, and the pathology score may be increased, e.g. to a predetermined score or to a score which is based on the pathology sequence score.

In yet another example, the pathology sequence score may be used to select portions of the images which are suspected pathology candidates. One or more pathology candidates may be, for example, cropped from the seed image based on the position of the tracked candidates identified in the pathology sequence. The cropped portions may be displayed to a user for screening pathologies, for example in accordance with embodiments described in U.S. Patent Application Publication No. 2013/0109915, assigned to the common assignee of the present invention and incorporated here by reference.

The display of data may be adapted in other methods based on the pathology sequence score. For example, in an edited or summarized movie, all image frames in a sequence depicting, including or containing a candidate pathology may be selected, even if other stream editing methods (e.g.

based on other features such as frame difference, etc.) may have determined that the data in certain frames of the frame sequence is redundant. One reason for selecting the complete or entire frame sequence in a summarized image stream is to improve the chances of the reviewing physician to detect the depicted pathology candidate. In the field of in vivo imaging, in some cases, if only one frame that depicts, includes or contains a pathology is presented in a summarized image stream, it may be missed or overlooked by a reviewing professional.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

Various embodiments have been presented. Each of these embodiments may of course include features from other embodiments presented, various embodiments presented are combinable with the other embodiments disclosed herein, and embodiments not specifically described may include various features described herein.

It will be appreciated by persons skilled in the art that the present invention is not limited to what has been particularly shown and described herein. Rather the scope of the present invention is defined only by the claims, which follow:

The invention claimed is:

1. A method for detecting a pathology frame sequence in an image stream captured in a body lumen, the method comprising:
   receiving an image stream comprising a plurality of image frames captured in a body lumen;
   receiving a pathology score for at least one image frame of the image frames, the pathology score indicating a probability that at least one pathology is included in an image frame;
   selecting, based on the pathology score, a seed frame from the image frames, the seed frame being an image frame that is likely to include at least one pathology candidate;
   selecting a pathology candidate in the seed frame; and
   tracking the pathology candidate in consecutive image frames adjacent to the seed frame in at least one of a forward direction or a backward direction with respect to the time of capture of the image frames, to identify a sequence of image frames adjacent to the seed frame and which comprises the pathology candidate.

2. The method of claim 1, wherein tracking the sequence of frames adjacent to the seed frame comprises:
   repeatedly and sequentially selecting from the image stream a pair of consecutive image frames, the pair comprising a first image frame and a second image frame, and
   tracking in the second image frame of each selected pair of consecutive image frames a representative of the pathology candidate tracked in the corresponding first image frame,
   wherein the first selected pair of consecutive image frames comprises the seed frame as the first frame and wherein the tracked pathology candidate of the first image frame of the first selected pair of consecutive image frames is the pathology candidate selected in the seed frame.

3. The method of claim 2, further comprising:
   determining a degree of overlap between the pathology candidate tracked in the first consecutive image frame of the pair of consecutive image frames and each pathology candidate detected in the second consecutive image frame of the pair of consecutive image frames, and
   selecting the pathology candidate detected in the second consecutive image frame with the highest degree of overlap as the representative, in the second image frame, of the pathology candidate tracked in the first image frame.

4. The method of claim 3, further comprising, if the degree of overlap is lower than a predetermined threshold, determining an end to the sequence of image frames.

5. The method of claim 3, wherein determining the degree of overlap comprises:
   calculating a Euclidian distance between a center of the tracked pathology candidate in the first consecutive image and a center of the each pathology candidate detected in the second consecutive image frame;
   calculating an area of the tracked pathology candidate in the first image; and
   normalizing the calculated distance based on the calculated area of the tracked pathology candidate in the first image.

6. The method of claim 1, further comprising
   determining a subsequence of image frames in the sequence of image frames, wherein:
   the subsequence of image frames comprises a plurality of contiguous image frames, the plurality of contiguous image frames comprising the pathology candidate,
   each image frame of the subsequence has a pathology score higher than a predefined threshold, and
   an area of the pathology candidate tracked in each image frame of the subsequence at least partially overlaps with an area of the pathology candidate in the seed frame.

7. The method of claim 6, wherein determining the subsequence comprises calculating, for a subgroup, comprising the seed frame in the sequence, at least one of: mean of pathology scores for the subgroup, number of image frames in the subgroup and pathology score differences from an edge of the subgroup.

8. The method of claim 7, further comprising calculating a subsequence score for each image in the subsequence, based on at least one parameter selected from the group consisting of: the received pathology score, the mean of the pathology scores for the subgroup, the number of image frames in the subgroup and the pathology score differences from an edge of the subgroup.

9. The method of claim 1, wherein the tracking of the pathology candidate in the adjacent image frames comprises repeatedly identifying the pathology candidate in a consecutive image frame, whereby each frame in the identified sequence of adjacent image frames includes the pathology candidate.

10. The method of claim 1, comprising determining a pathology sequence score for the seed frame, wherein the pathology sequence score indicates the probability that a sequence of image frames adjacent to the seed frame comprises the selected pathology candidate, and wherein the pathology sequence score is calculated based on the received pathology score.

11. The method of claim 10, wherein the processor is configured to: if the pathology sequence score is above a predetermined threshold, perform at least one of: increasing the pathology score of the seed frame and determining that the seed frame includes a pathology.

12. The method of claim 10, wherein the processor is further configured to:
cluster image frames in the defined sequence, wherein each cluster comprises image frames that depict the pathology candidate captured in a certain angle; and
assign a cluster score to each image frame in the sequence, wherein the cluster score is calculated based on the number of frames in the cluster to which the image frame belongs, and wherein the pathology sequence score is further calculated based on the cluster score.

13. The method of claim 1, wherein the tracking of the pathology candidate in the adjacent image frames is performed such that the identified sequence of image frames may include non-pathology frames.

14. The method of claim 13, further comprising:
selecting a contiguous subgroup of frames from the identified sequence of frames, the contiguous subgroup of frames surrounding the seed frame and comprising the pathology candidate; and
determining a pathology sequence score for the seed frame, wherein the pathology sequence score indicates the probability that a sequence of image frames adjacent to the seed frame comprises the selected pathology candidate, and wherein the pathology sequence score is calculated based on the received pathology score.

15. The method of claim 1, wherein the tracking of the pathology candidate is performed for a predetermined maximum amount of adjacent image frames, or the tracking of the pathology candidate is performed until a maximal length of sequence of image frames is reached.

16. A system to automatically detect a pathology frame sequence in an image stream captured in a body lumen, the system comprising:
a storage unit to store an image stream, the image stream comprising a plurality of image frames captured in the body lumen, and to store a pathology score for at least a portion of the image frames, the pathology score correlating to a probability that at least one pathology candidate is depicted in an image frame; and
a processor configured to:
select, based on the pathology score, a seed frame from the image stream which is likely to include at least one pathology candidate;
select a pathology candidate in the seed frame; and
track the pathology candidate in consecutive image frames adjacent to the seed frame in at least one of a forward direction or a backward direction with respect to the time of capture of the image frames, to identify a sequence of image frames adjacent to the seed frame and which comprises the pathology candidate.

17. The system of claim 16, wherein the processor is configured to identify a sequence of frames adjacent to the selected frame by:
repeatedly and sequentially selecting from the original image stream a pair of consecutive image frames, the pair comprising a first image frame and a second image frame, and
tracking in each selected pair of consecutive image frames a representative of the pathology candidate in the current sequence of image frames,
wherein the first selected pair of consecutive image frames comprises the seed frame as the first frame and wherein the tracked pathology candidate of the first image frame of the first selected pair of consecutive image frames is the pathology candidate selected in the seed frame.

18. The system of claim 17, wherein the tracking of the pathology candidate is performed for a predetermined maximum amount of adjacent image frames, or the tracking of the pathology candidate is performed until a maximal length of sequence of image frames is reached.

19. The system of claim 16, wherein the processor is configured to calculate a pathology sequence score for the seed frame, wherein the pathology sequence score indicates the probability that a sequence of image frames adjacent to the seed frame comprises the selected pathology candidate, and wherein the pathology sequence score is calculated based on the received pathology score.

20. The system of claim 19, wherein the processor is further configured to perform at least one of: increase the pathology score of the seed frame and determine that the seed frame includes a pathology, if the pathology sequence score is above a predetermined threshold.

21. The system of claim 16, further comprising a pathology detector configured to determine the pathology score.

22. A method for detecting a pathology frame sequence in an image stream captured in a body lumen, the method comprising:
receiving an image stream comprising a plurality of image frames captured in a body lumen;
selecting a seed frame from the image frames, the seed frame being an image frame that is likely to include at least one pathology candidate;
selecting a pathology candidate in the seed frame; and
tracking the pathology candidate in consecutive image frames adjacent to the seed frame in at least one of a forward direction or a backward direction with respect to the time of capture of the image frames, to identify a sequence of image frames adjacent to the seed frame and which comprises the pathology candidate.

23. The method of claim 22, further comprising receiving a pathology score for at least one image frame of the image frames, the pathology score indicating a probability that at least one pathology is included in an image frame, wherein the selecting of the seed frame is based on the pathology score.

* * * * *